(12) United States Patent
Imai

(10) Patent No.: US 7,564,607 B2
(45) Date of Patent: Jul. 21, 2009

(54) LIGHT SOURCE MODULE, OPTICAL SCANNING DEVICE, AND IMAGE FORMING APPARATUS

(75) Inventor: Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 12/207,739

(22) Filed: Sep. 10, 2008

(65) Prior Publication Data
US 2009/0073531 A1   Mar. 19, 2009

(30) Foreign Application Priority Data
Sep. 13, 2007   (JP) .............................. 2007-238210

(51) Int. Cl.
*G02B 26/08* (2006.01)
(52) U.S. Cl. .................. 359/196.1; 359/212.1; 347/260
(58) Field of Classification Search ........................ None
See application file for complete search history.

(56) References Cited

U.S. PATENT DOCUMENTS

| 6,813,051 B2 | 11/2004 | Suzuki et al. |
| 7,277,212 B2 | 10/2007 | Miyatake et al. |
| 2004/0240000 A1 | 12/2004 | Miyatake et al. |
| 2005/0190420 A1 | 9/2005 | Imai et al. |
| 2006/0158711 A1 | 7/2006 | Imai et al. |
| 2007/0058255 A1 | 3/2007 | Imai et al. |
| 2007/0236557 A1 | 10/2007 | Imai et al. |
| 2008/0019255 A1 | 1/2008 | Imai et al. |
| 2008/0068678 A1 | 3/2008 | Suzuki et al. |
| 2008/0170283 A1 | 7/2008 | Imai |
| 2008/0192323 A1 | 8/2008 | Nakamura et al. |

FOREIGN PATENT DOCUMENTS

| JP | 2004-287292 | 10/2004 |
| JP | 2005-250319 | 9/2005 |
| JP | 2006-234955 | 9/2006 |
| JP | 2006-234956 | 9/2006 |

*Primary Examiner*—James Phan
(74) *Attorney, Agent, or Firm*—Oblon, Spivak, McClelland, Maier & Neustadt, P.C.

(57) ABSTRACT

A coupling lens collimates an optical beam emitted from a laser light source. An aperture shields a peripheral light flux area of the collimated optical beam. A phase adjusting element partially changes a phase of wavefront of the optical beam. An auxiliary aperture is formed on an outer side of a normalized aperture size in at least one of a main scanning direction and a sub-scanning direction. The phase adjusting element is formed in a parallel plate, and changes at least a phase of wavefront of a peripheral portion of the optical beam to compensate decreases of the beam spot size and the depth allowance caused by the auxiliary aperture.

12 Claims, 9 Drawing Sheets

LIGHT SOURCE MODULE, OPTICAL SCANNING DEVICE, AND IMAGE FORMING APPARATUS

CROSS-REFERENCE TO RELATED APPLICATIONS

The present application claims priority to and incorporates by reference the entire contents of Japanese priority document 2007-238210 filed in Japan on Sep. 13, 2007.

BACKGROUND OF THE INVENTION

1. Field of the Invention

The present invention relates to a light source module, an optical scanning device, and an image forming apparatus.

2. Description of the Related Art

An optical scanning device that optically scans a scanning surface such that an optical beam emitted from a laser light source is deflected by a deflecting unit and the deflected optical beam is focused on the scanning surface as a beam spot by an imaging optical system has been widely used in conjunction with an image forming apparatus, such as a digital copier, a laser printer, a laser facsimile machine, and a laser plotter. There has been developed various types of optical scanning devices.

In technologies related to an optical scanning, one of issues that have been consistently expected to achieve is "speeding up of the optical scanning". An image formation by the optical scanning is performed in such a manner that a photosensitive surface of a photosensitive element is exposed to a beam spot to which a laser beam is focused by each 1-dot. An optical energy required for the 1-dot exposure is obtained by the product of a 1-dot exposure time and a light intensity of the beam spot. To realize the "speeding up of the optical scanning", the 1-dot exposure time needs to be reduced, i.e., it is essential to increase the "light intensity of the beam spot".

As one of methods for a high-speed image formation by an optical scanning, there is a multibeam optical scanning. In this method, optical writings on a plurality of scanning lines can be performed at the same time by a one-time optical scanning, so that an image forming speed can be dramatically improved. However, even in a case of the multibeam optical scanning, there has still been expected to shorten a scanning time, so that it is necessary to increase a light intensity of a beam spot.

Furthermore, a vertical cavity surface emitting laser (VCSEL) has been put to practical use in recent years. The VCSEL is suited to a light source for the multibeam optical scanning because a plurality of light-emitting sources can be easily arrayed on the same plane. However, an emission intensity of the VCSEL is lower than that of a conventionally-known edge emitting laser diode. Therefore, in this case also, it is a matter of how to increase a light intensity of a beam spot.

A light intensity of a beam spot is determined depending on an emission intensity of a light source and a propagating efficiency of an optical beam from the light source down to a scanning surface. Therefore, to increase the light intensity of the beam spot, it is also necessary to increase the propagating efficiency of the optical beam.

In an optical scanning device, when a propagating efficiency of an optical beam decreases drastically, as one of factors, it can be considered that the optical beam is shielded by "an apertured plate for beam shaping". As is commonly known, when an optical beam emitted from a laser light source is focused as a beam spot, a beam spot size is inversely proportional to a numerical aperture of a lens that condenses the optical beam to the beam spot, and is proportional to a wavelength. Therefore, as an aperture size (diameter) of the apertured plate increases, the beam spot size is getting decreased.

A size of 1 dot in an image formation is determined depending on the beam spot size, and also determined based on a specification of the optical scanning device in design. If the beam spot size is excessively larger than a designed value, it is not possible to meet "a specification for a resolution of an image to be formed" that is required for the optical scanning device, and thereby causing a decrease in an image quality of the formed image. On the contrary, if the beam spot size is excessively smaller than the designed value, a space is generated between adjacent dots, and thereby causing a decrease in an image quality of the formed image.

To prevent such a situation, "the beam spot size" needs to be "within an allowable range" around the designed value.

The beam spot size denotes "a diameter of a beam waist" formed on a portion of the focused optical beam in design. The beam size (diameter) is getting larger with increasing a distance from a position of the beam waist.

The optical scanning device is designed so that the position of the beam waist conforms to a scanning surface. However, in an actually-manufactured optical scanning device, it is not possible to avoid a manufacturing error or an assembling error of components and optical elements. Therefore, a "misalignment" generally occurs due to a positional error between the position of the beam waist and "a surface of a photosensitive image carrier as the scanning surface". When the scanning surface does not conform to the position of the beam waist due to the "misalignment", the beam spot size on the scanning surface increases when the misalignment occurs in either direction, i.e., whether in a travel direction of the optical beam or not. Such "an increase in the beam spot size due to the misalignment" is called "a spot size dilution", and the misalignment is called "a defocus".

An allowable range of the "the spot size dilution" with respect to the beam spot size in design is called "a depth allowance". The depth allowance is "a range of the defocus in a direction of an optical axis to stay within an allowable beam spot size (for example, to stay within a range of the beam spot size to 10% increase of which)". When the defocus of the optical beam with respect to the scanning surface is within the depth allowance, an actual beam spot size on the scanning surface is within the allowable range of the spot size dilution, so that the optical scanning can be performed appropriately.

There is a limit to reduce an error in a manufactured optical scanning device, so that the depth allowance is preferably made as large as possible.

To increase a light intensity of a beam spot by improving "a propagating efficiency of an optical beam" in an optical scanning, there is a way to "decrease a light shielding rate of the apertured plate (i.e., increase an amount of light passing through an aperture of the apertured plate) by increasing an aperture size of the aperture. However, when the aperture size is increased to a degree effective in increasing the light intensity, a diameter of the beam waist is reduced, whereby the beam spot size on the scanning surface is reduced beyond "the allowable range of the beam spot size". Consequently, a state of convergence of the optical beam toward the beam waist becomes precipitous, resulting in a reduction of "the depth allowance". Such a reduction of the beam waist size caused by the increase in the aperture size of the aperture will be referred to as "a spot size concentration".

Therefore, it is not preferable to "simply increase the aperture size of the aperture" to increase the light intensity of the beam spot because it causes such a side-effect as "the spot size concentration or narrowing of the depth allowance".

As a method for preventing a reduction of a beam spot size or a reduction of a depth allowance while increasing an amount of light passing through an apertured plate by increasing an aperture size of an aperture of the apertured plate, Japanese Patent Application Laid-open No. 2006-234955 and Japanese Patent Application Laid-open No. 2006-234956 disclose "a method of superimposing optical beams branched by a diffraction grating on a scanning surface". However, in this method, it is necessary to perform a phase focusing among a plurality of the branched optical beams at high accuracy. Therefore, it is difficult to obtain desired characteristics due to a production tolerance or a temporal change.

Furthermore, Japanese Patent Application Laid-open No. 2006-234955 and Japanese Patent Application Laid-open No. 2006-234956 discloses "a method of superimposing optical beams on an imaging surface by changing a state of deflection of a part of the optical beams". However, in this method, the optical beams in different deflection states from one another are incoherently superimposed (superimposed based on the intensity), so that the optical beams tend to spread, and thus it is difficult to ensure a depth allowance.

SUMMARY OF THE INVENTION

It is an object of the present invention to at least partially solve the problems in the conventional technology.

According to an aspect of the present invention, there is provided a light source module for an optical scanning device including a deflecting unit that deflects an optical beam and an imaging optical system that focuses the optical beam on a scanning surface as a beam spot to optically scan the scanning surface. The light source module includes a laser light source that emits an optical beam; a coupling lens that collimates the optical beam emitted from the laser light source, and outputs a collimated optical beam having a desired beam spot size; an aperture that shields a peripheral light flux area of the collimated optical beam output from the coupling lens; a phase adjusting element that partially changes a phase of wavefront of the optical beam; and an auxiliary aperture formed on an outer side of a normalized aperture size, which is a size of the aperture when the beam spot formed on the scanning surface meets design values of a beam spot size and a depth allowance, in at least one of a main scanning direction and a sub-scanning direction. The phase adjusting element is formed in a parallel plate, and changes at least a phase of wavefront of a peripheral portion of the optical beam to compensate decreases of the beam spot size and the depth allowance caused by the auxiliary aperture.

Furthermore, according to another aspect of the present invention, there is provided an optical scanning device including a deflecting unit that deflects an optical beam emitted from at least one laser light source; at least one imaging optical system that focuses the optical beam deflected by the deflecting unit on at least one scanning surface as a beam spot; and at least one light source module including a laser light source that emits an optical beam, a coupling lens that collimates the optical beam emitted from the laser light source, and outputs a collimated optical beam having a desired beam spot size, an aperture that shields a peripheral light flux area of the collimated optical beam output from the coupling lens, a phase adjusting element that partially changes a phase of wavefront of the optical beam, and an auxiliary aperture formed on an outer side of a normalized aperture size, which is a size of the aperture when the beam spot formed on the scanning surface meets design values of a beam spot size and a depth allowance, in at least one of a main scanning direction and a sub-scanning direction. The phase adjusting element is formed in a parallel plate, and changes at least a phase of wavefront of a peripheral portion of the optical beam to compensate decreases of the beam spot size and the depth allowance caused by the auxiliary aperture.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
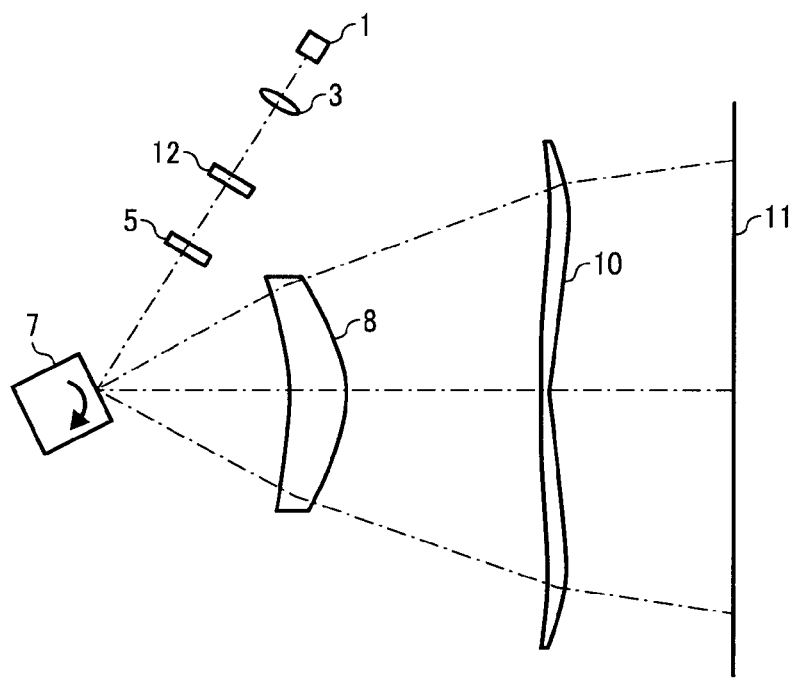
FIG. 1 is a schematic diagram for explaining an optical configuration of an optical scanning device according to an embodiment of the present invention.

FIG. 1 shows one example of an optical configuration of an optical scanning device according to an embodiment of the present invention.

In FIG. 1, an optical system composing a light path from a laser light source 1 down to a scanning surface 11 is virtually depicted on a plane surface.

As shown in FIG. 1, an optical beam emitted from the laser light source 1 is shaped into a parallel luminous flux by a coupling lens 3, and passes through an optical member 12. After passing through the optical member 12, the optical beam is focused in a sub-scanning direction (a direction perpendicular to the plane surface of the drawing) by a cylinder lens 5, and formed into "a line image extending in a main scanning direction" on near a deflection surface of a polygon mirror 7 as a deflecting unit. In the present embodiment, the polygon mirror 7 has a polygon with four sides, i.e., has four deflection surfaces.

The optical beam reflected on the deflection surface of the polygon mirror 7 is incident on scanning lenses 8 and 10, and is focused as a beam spot on the scanning surface 11 by the actions of the scanning lenses 8 and 10.

When the polygon mirror 7 rotates at a constant velocity, the optical beam reflected on the deflection surface is deflected at a constant angular velocity, whereby the scanning surface 11 is optically scanned by the beam spot.

As will be described later, the optical member 12 is "an integrated combination of an apertured plate and a phase adjusting element". The apertured plate serves to shield a peripheral luminous-flux portion of the optical beam, and the phase adjusting element serves to adjust a phase of wavefront of the optical beam.

In the optical scanning device shown in FIG. 1, "an imaging optical system" is composed of the coupling lens 3, the phase adjusting element of the optical member 12, the cylinder lens 5, and the scanning lenses 8 and 10. The scanning lenses 8 and 10 compose so-called "an f-theta lens", and have a function of controlling a displacement of the beam spot, which is deflected at the constant angular velocity, on the scanning surface 11 to be performed at a constant velocity.

The scanning lenses 8 and 10 make a positional relation between the deflection surface of the polygon mirror 7 and the scanning surface 11 into "a conjugate relation in the sub-scanning direction". In the sub-scanning direction, "the line image extending in the main scanning direction" is an object point of the f-theta lens composed of the scanning lenses 8 and 10, so that an optical face tangle of the polygon mirror 7 can be corrected. Incidentally, both the scanning lenses 8 and 10 composing the f-theta lens are made of plastic. The plastic scanning lens may be affected by an environmental fluctuation, so that a diffraction grating can be formed on one or more lens surfaces to correct a fluctuation in an imaging function of the plastic scanning lens due to the environmental fluctuation.

The scanning surface 11 shown in FIG. 1 is actually a photosensitive surface of an image carrier.

Except for the optical member 12, the optical configuration of the optical scanning device shown in FIG. 1 is identical to that of the conventionally-known technology. The optical scanning device having such a configuration can be set up to a tandem-type optical scanning device as shown in FIG. 2.

Figure 2:
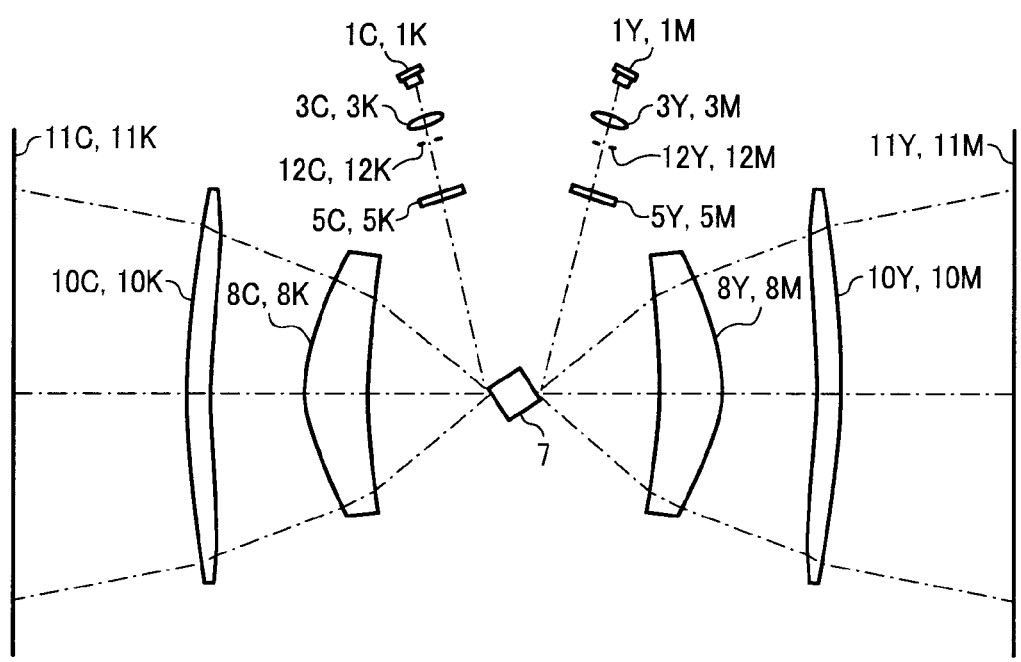
FIG. 2 is a schematic diagram of a tandem-type optical scanning device according to the embodiment.

FIG. 2 shows an optical system of the tandem-type optical scanning device viewed from the sub-scanning direction, i.e., a direction of a rotating shaft of the polygon mirror 7. The portions identical to those in FIG. 1 are denoted with the same reference numerals with suffix of "M", "Y", "C", and "K". For sake of simplicity, in FIG. 2, a light-path inflecting mirror located on each of light paths from the polygon mirror 7 down to each of four scanning surfaces 11Y, 11M, 11C, and 11K as an optical scanning position is omitted from the drawing, and the light paths are depicted as if the light paths were located on a plane surface.

In this optical scanning device, each of the scanning surfaces 11Y, 11M, 11C, and 11K is optically scanned by a corresponding optical beam. Each of the scanning surfaces 11Y, 11M, 11C, and 11K is actually a surface of "a photoconductive photosensitive drum" as an image carrier. Electrostatic latent images for magenta (M), yellow (Y), cyan (C), and black (K) images are formed on the surfaces of the photosensitive drums, and developed into M, Y, C, and K toner images respectively. The M, Y, C, and K toner images are sequentially transferred onto a transfer medium in a superimposed manner, and thereby forming a full-color image. Hereinafter, the photosensitive drums are denoted with the same reference numerals as the scanning surfaces 11Y, 11M, 11C, and 11K.

In FIG. 2, reference numerals 1Y, 1M, 1C, and 1K denote "a laser light source" for Y, M, C, and K color images, respectively. The laser light sources 1Y and 1M are arranged to overlap each other in the sub-scanning direction, i.e., a direction perpendicular to the plane surface of the drawing. The laser light source 1M is intensity-modulated by "an image signal corresponding to the M-color image", and the laser light source 1Y is intensity-modulated by "an image signal corresponding to the Y-color image".

Similarly, the laser light sources 1C and 1K are arranged to overlap each other in the sub-scanning direction. The laser light source 1C is intensity-modulated by "an image signal corresponding to the C-color image", and the laser light source 1K is intensity-modulated by "an image signal corresponding to the K-color image".

Each of optical beams emitted from the laser light sources 1Y and 1M is shaped into a parallel luminous flux by each of coupling lenses 3Y and 3M (which are arranged to overlap each other in the sub-scanning direction), and passes through each of optical members 12Y and 12M (which are arranged to overlap each other in the sub-scanning direction). After passing through each of the optical members 12Y and 12M, each of the optical beams is focused in the sub-scanning direction by each of cylinder lenses 5Y and 5M (which are arranged to overlap each other in the sub-scanning direction), and is incident on the polygon mirror 7. Specifically, each of the optical beams is focused by each of the cylinder lenses 5Y and 5M, and formed into "a line image extending in the main scanning direction" on near a deflection surface of the polygon mirror 7. After that, each of the optical beams deflected by the polygon mirror 7 is incident on each of scanning lenses 8Y, 10Y and scanning lenses 8M, 10M, and is focused as a beam spot on each of the scanning surfaces 11Y and 11M by the actions of the scanning lenses 8Y, 10Y and the scanning lenses 8M, 10M, respectively, and a beam spot is formed on each of the scanning surfaces 11Y and 11M by the actions of the scanning lenses 8Y, 10Y and the scanning lenses 8M, 10M. As a result, each of the scanning surfaces 11Y and 11M is optically scanned by each of the beam spots.

Similarly, each of optical beams emitted from the laser light sources 1C and 1K is shaped into a parallel luminous flux by each of coupling lenses 3C and 3K (which are arranged to overlap each other in the sub-scanning direction), and passes through each of optical members 12C and 12K (which are arranged to overlap each other in the sub-scanning direction). After passing through each of the optical members 12C and 12K, each of the optical beams is focused in the sub-scanning direction by each of cylinder lenses 5C and 5K (which are arranged to overlap each other in the sub-scanning direction), and is incident on the polygon mirror 7. After that, each of the optical beams deflected by the polygon mirror 7 is incident on each of scanning lenses 8C, 10C and scanning lenses 8K, 10K, and is focused as a beam spot on each of the scanning surfaces 11C and 11K by the actions of the scanning lenses 8C, 10C and the scanning lenses 8K, 10K. As a result, each of the scanning surfaces 11C and 11K is optically scanned by each of the beam spots.

Figure 3:
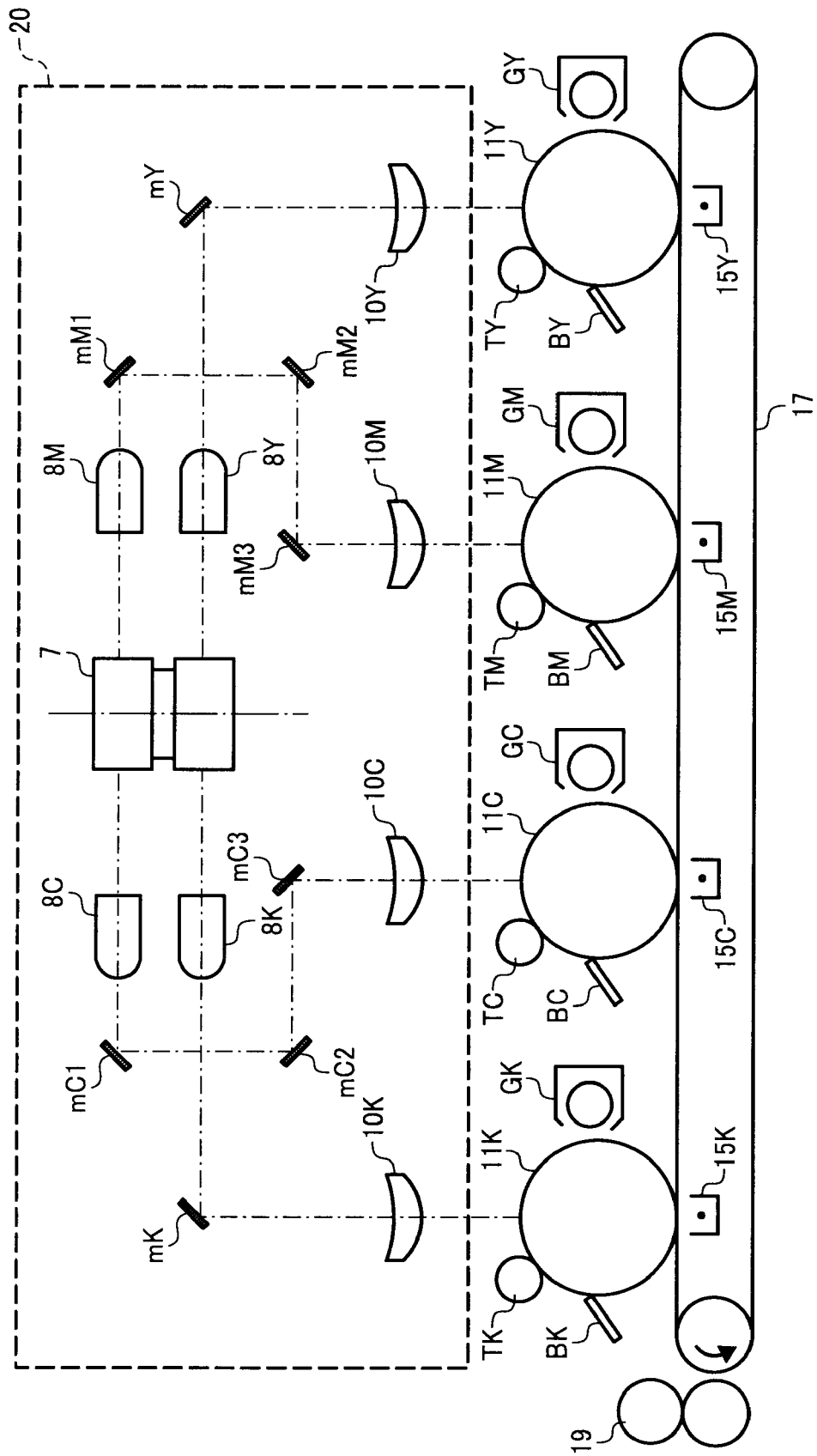
FIG. 3 is a schematic diagram of a tandem-type image forming apparatus including the optical scanning device shown in FIG. 2.

FIG. 3 is a schematic diagram of an image forming apparatus including the optical scanning device shown in FIG. 2. A portion denoted with a reference numeral 20 in FIG. 3 corresponds to the optical scanning device shown in FIG. 2. As shown in FIG. 3, the polygon mirror 7 has four two-tiered deflection surfaces. One of optical beams deflected in an upper tier of the polygon mirror 7 is introduced to the photosensitive drum 11M through a light path inflected by light-path inflecting mirrors mM1, mM2, and mM3, and the other optical beam is introduced to the photosensitive drum 11C through a light path inflected by light-path inflecting mirrors mC1, mC2, and mC3.

One of optical beams deflected in a lower tier of the polygon mirror 7 is introduced to the photosensitive drum 11Y through a light path inflected by a light-path inflecting mirror mY, and the other optical beam is introduced to the photosensitive drum 11K through a light path inflected by a light-path inflecting mirror mK.

Therefore, each of the photosensitive drums 11Y, 11M, 11C, and 11K is optically scanned by the corresponding optical beam emitted from each of the laser light sources 1Y, 1M, 1C, and 1K. The photosensitive drums 11Y, 11M, 11C, and 11K rotate clockwise at the constant velocity, and are uniformly charged by each of charging rollers TY, TM, TC, and TK as a charging unit. When each of surfaces of the photosensitive drums 11Y, 11M, 11C, and 11K is scanned by each of the optical beams corresponding to Y, M, C, and K color image data, Y, M, C, and K color images are respectively written on each of surfaces of the photosensitive drums 11Y, 11M, 11C, and 11K, whereby electrostatic latent images (negative latent images) for the Y, M, C, and K color images are respectively formed on each of the surfaces of the photosensitive drums 11Y, 11M, 11C, and 11K.

These electrostatic latent images are reversal-developed by developing devices GY, GM, GC, and GK respectively. As a result, Y, M, C, and K toner images are respectively formed on each of the surfaces of the photosensitive drums 11Y, 11M, 11C, and 11K.

The toner images are transferred onto "a transfer sheet (not shown)" in a superimposed manner. Specifically, while the transfer sheet is conveyed on a conveying belt 17, the Y, M, C, and K toner images formed on the photosensitive drums 11Y, 11M, 11C, and 11K are sequentially transferred onto the transfer sheet in a superimposed manner by transfer units 15Y, 15M, 15C, and 15K, respectively.

As a result, a full-color image is formed on the transfer sheet. The full-color image is fixed on the transfer sheet by a fixing device 19. Alternatively, the image forming apparatus can employ an intermediate transfer method. In this method, a full-color image is formed in such a manner that Y, M, C, and K toner images formed on the photosensitive drums 11Y, 11M, 11C, and 11K are sequentially primary-transferred onto an intermediate transfer belt in a superimposed manner, and the superimposed full-color toner image transferred onto the intermediate transfer belt is secondary-transferred onto a transfer sheet and fixed thereon.

In the present embodiment, the scanning lenses 8Y and 8M on which optical beams deflected to the right side of the polygon mirror 7 in FIG. 3 are incident are separately provided. Alternatively, the scanning lenses 8Y and 8M can be combined into a two-tiered scanning lens integrally. Similarly, the scanning lenses 8C and 8K on which optical beams deflected to the left side of the polygon mirror 7 in FIG. 3 are incident can be combined into a two-tiered scanning lens integrally.

In the image forming apparatus including the optical scanning device as described above, "a light source module" is composed of a laser light source, a coupling lens, an apertured plate, and a phase adjusting element. The coupling lens couples an optical beam emitted from the laser light source to shape into a parallel optical beam or a substantially parallel optical beam having a desired beam size. The apertured plate shields a peripheral luminous-flux portion of the coupled optical beam. The phase adjusting element changes a phase of wavefront of the optical beam partially.

In a case shown in FIG. 1, the light source module is composed of the laser light source 1, the coupling lens 3, and the optical member 12 that is "the integrated combination of the apertured plate and the phase adjusting element".

Figure 4A:
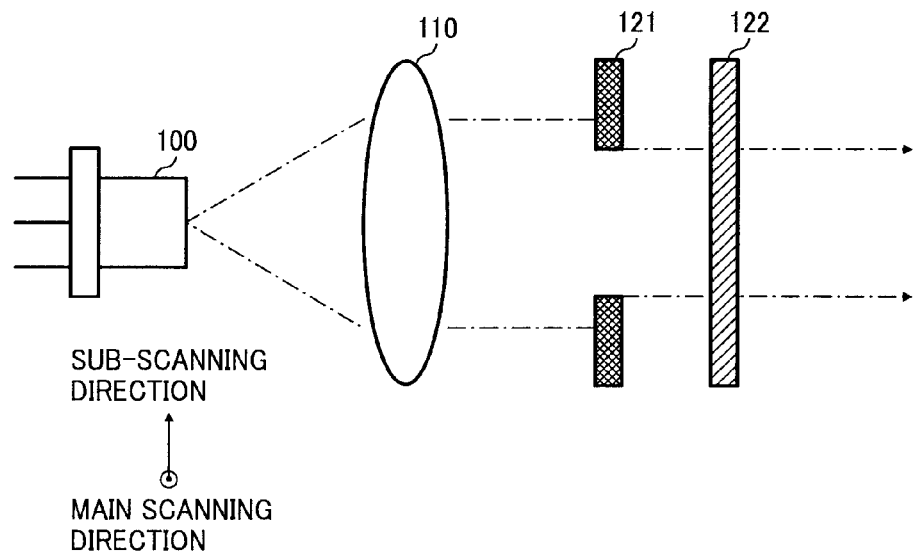
FIGS. 4A to 4C are schematic diagrams for explaining a configuration of a light source module according to the embodiment.

The light source module is explained in detail below with reference to FIGS. 4A to 4C. A light source module shown in FIG. 4A is composed of a laser light source 100, a coupling lens 110, an apertured plate 121, and a phase adjusting element 122. In this case, the apertured plate 121 and the phase adjusting element 122 are separately provided as shown in FIG. 4A. Alternatively, the apertured plate 121 and the phase adjusting element 122 can be combined integrally as the optical member 12 shown in FIG. 1.

The order of arrangement of the apertured plate 121 and the phase adjusting element 122 on a light path of an optical beam can be changed between them. Regardless of whether the apertured plate 121 and the phase adjusting element 122 are separately provided or combined integrally, the phase adjusting element 122 is preferably arranged to be closer to the laser light source 100 than a light deflecting unit is, and the apertured plate 121 and the phase adjusting element 122 are preferably arranged between the coupling lens 110 and a cylinder lens.

Figure 4B:
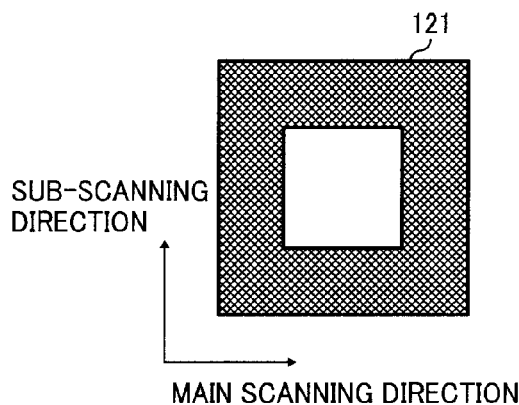

FIG. 4B is a schematic diagram of the apertured plate 121 viewed from a direction of an optical axis. The apertured plate 121 includes a square aperture. The aperture is located in the center of a light shielding portion of the apertured plate 121. An optical beam passes through the aperture. A peripheral luminous-flux portion of the optical beam is shielded by the light shielding portion. FIG. 4C is schematic diagram of the phase adjusting element 122. The phase adjusting element 122 viewed from a direction of the light path is depicted on the left side of the drawing, and a cross section of the phase adjusting element 122 is depicted on the right side of the drawing. In this example, the phase adjusting element 122 is made of a transparent parallel plate, and two "projections extending in the main scanning direction, i.e., having a rectangular shape in cross section" are formed to be parallel to each other on one side of the phase adjusting element 122. The projections are used to adjust a phase of wavefront of an optical beam passing through the phase adjusting element 122.

Figure 4C:
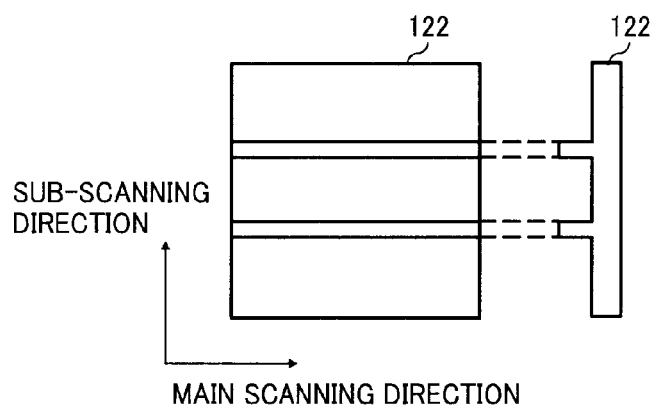

Incidentally, the right-side drawing in FIG. 4C is an explanatory diagram, so that a height of the projections is depicted to be higher than an actual size. An actual height of the projections is determined depending on a wavelength region. Instead of forming the projections on a face of the parallel plate having a uniform refractive index, it is also possible to form a refractive-index distribution corresponding to the projections on the parallel plate to adjust the phase.

For sake of simplicity, in FIG. 4C, the phase adjusting element 122 is composed of two-stage phase adjusting portions (i.e., the parallel plate is composed of a projection portion and a non-projection portion having a different thickness from each other in two stages), and configured to have "a phase distribution in the sub-scanning direction only (a distribution of the phase adjusting portions for adjusting a phase of wavefront)", but not limited thereto. Alternatively, the phase adjusting element 122 can be configured to have, for example, a circular or rectangular phase distribution including phase distributions in the sub-scanning direction and the main scanning direction, or composed of three or more stages of phase adjusting portions.

In this manner, by designing the phase distribution appropriately, it is possible to "reduce or prevent a spot size concentration or narrowing of a depth allowance while broadening the aperture of the apertured plate".

An effect of the phase adjustment by the phase adjusting element is explained below based on a simulation result.

Figure 5A:
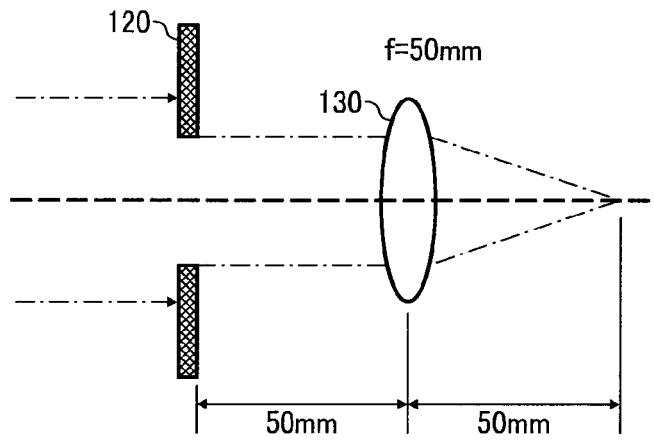
FIGS. 5A to 5B are schematic diagrams for explaining a simulation of an effect of a phase adjustment by the light source module.

The apertured plate and the phase adjusting element are modeled to an optical member 120 shown in FIG. 5A.

As shown in FIG. 5A, conditions are set so that "a plane wave having a uniform light intensity" is incident on the optical member 120 from the left side of the drawing, and an ideal lens having a focal length of 50 millimeters (mm), i.e., an aplanatic convex lens 130 is arranged at a position located 50 mm away from the optical member 120 to the right.

Figure 5B:
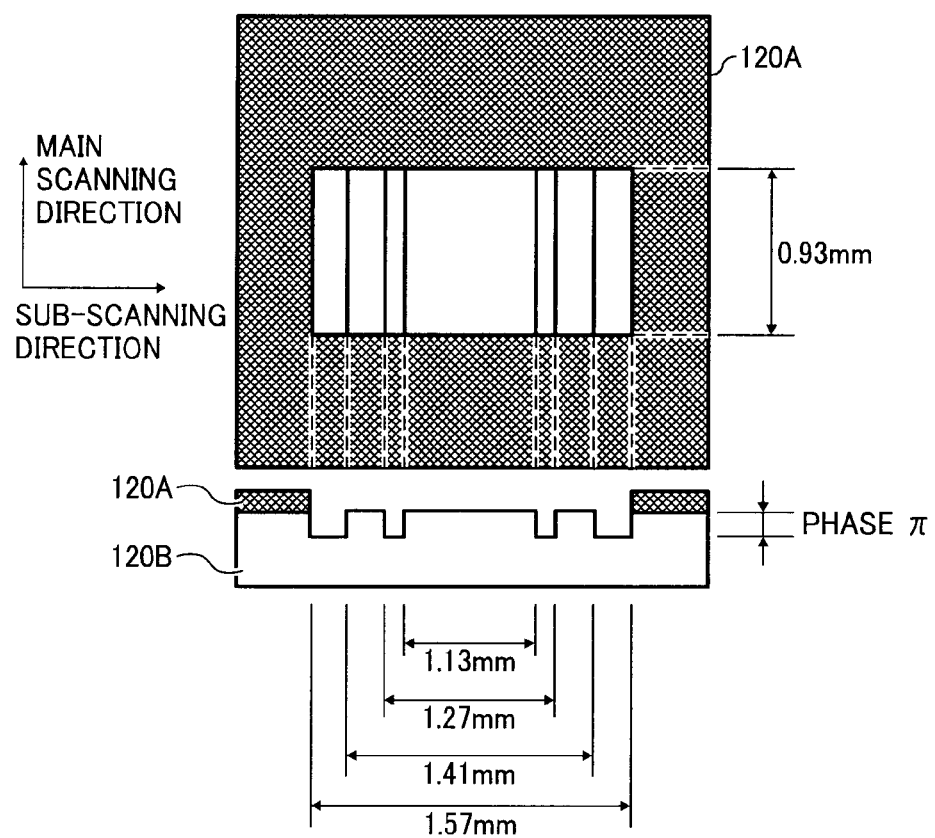

The optical member 120 is, as shown in FIG. 5B, an integrated combination of an apertured plate 120A and a phase adjusting element 120B.

Under the above conditions, an incident light is focused on an imaging-side focal plane of the convex lens 130 as an imaging plane through the apertured plate 120A and the phase adjusting element 120B. The optical member 120 is arranged so that an exit-side plane of the optical member 120 is positioned at a front-side focal position of the convex lens 130.

As shown in FIG. 5B, the apertured plate 120A includes "a rectangular aperture". A dimension of the aperture is 0.93 mm in the main scanning direction and 1.57 mm in the sub-scanning direction. The phase adjusting element 120B has "a phase distribution in the sub-scanning direction only". Two "grooves parallel with the main scanning direction" of 80 micrometers (μm) in width are respectively formed on a portion of the phase adjusting element 120B along each of outermost ends of the aperture in the sub-scanning direction, and two "grooves parallel with the main scanning direction" of 70 μm in width are respectively formed on a portion of the phase adjusting element 120B so that the grooves of 70 μm in width are respectively located on the slightly inner side of each of the grooves of 80 μm in width. A depth of the grooves is set so that a phase with respect to a use wavelength is "π". A dimension of each of the grooves is as shown in FIG. 5B.

Figure 6A:
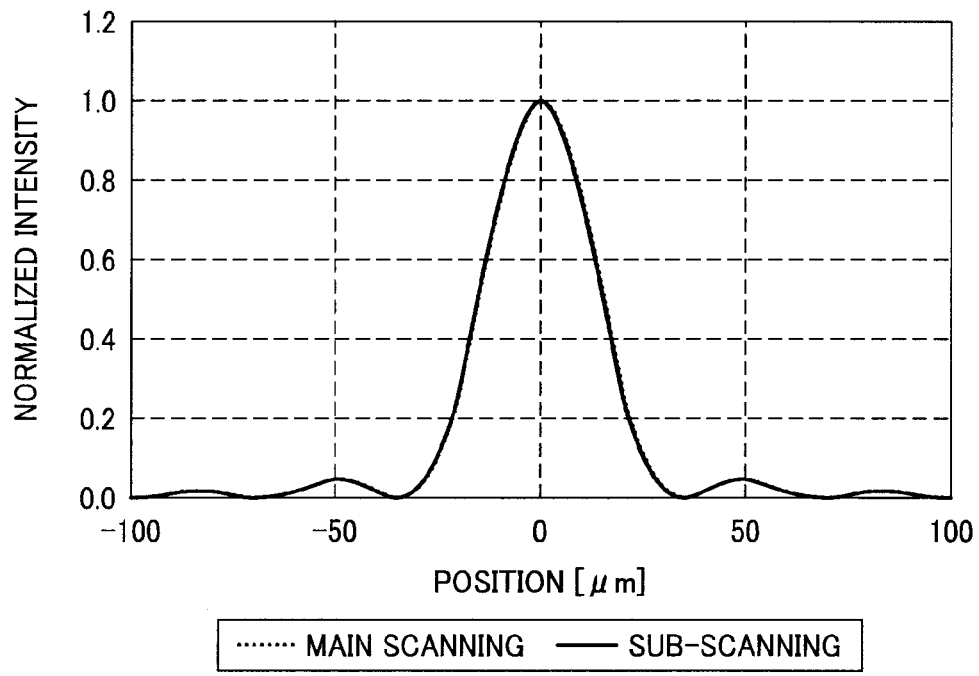
FIGS. 6A and 6B are graphs showing a beam profile of a beam spot and a depth allowance in design when a phase adjustment is not performed.
Figure 6B:
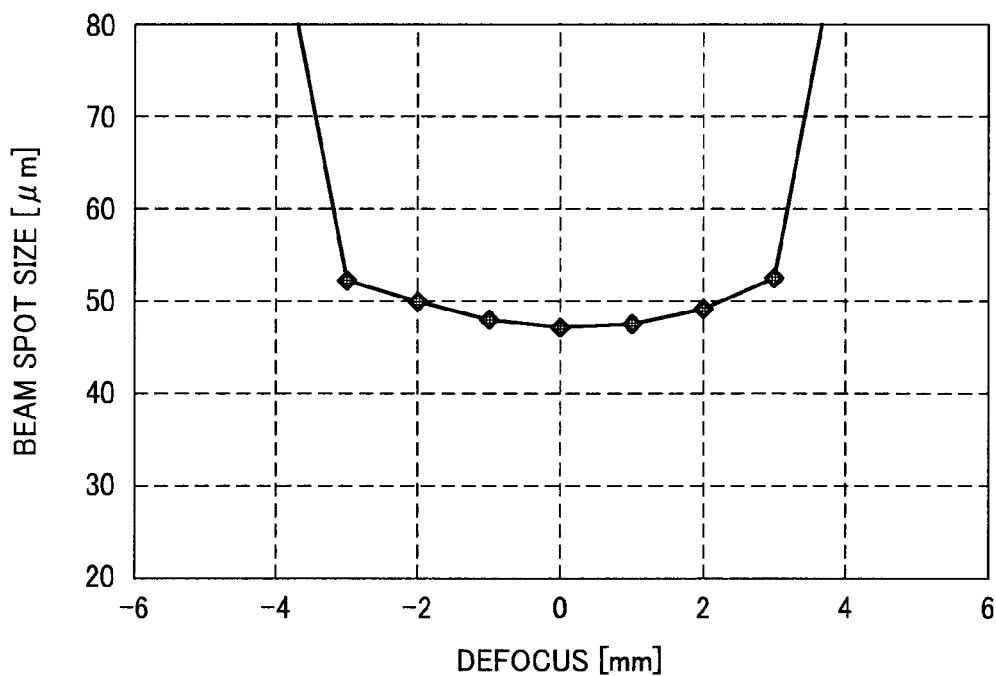

FIGS. 6A and 6B show a simulation result of "a comparative example" where the phase adjusting element 120B is not used. In this example, it is assumed that a dimension of the aperture of the apertured plate 120A is 0.93 mm in the main scanning direction and 0.93 mm in the sub-scanning direction.

FIG. 6A is a graph showing "profiles of a main-scanning cross section and a sub-scanning cross section of a beam profile at a peak intensity" at an imaging-side focal position of the convex lens 130. The peak intensity is normalized to 1. As shown in FIG. 6A, a dashed curve denotes the main-scanning cross section, and a solid curve denotes the sub-scanning cross section. The profiles of the main-scanning cross section and the sub-scanning cross section substantially overlap with each other. This is because an incident light has a uniform light intensity, the apertured plate 120A includes the square aperture, and the convex lens 130 is an axisymmetric lens.

FIG. 6B is a graph showing a change in a beam spot size (defined as a diameter of a beam located at $1/e^2$ where the peak intensity can be obtained) with respect to a defocus. The graph shown in FIG. 6B shows that a depth allowance is about ±3 mm.

Figure 7A:
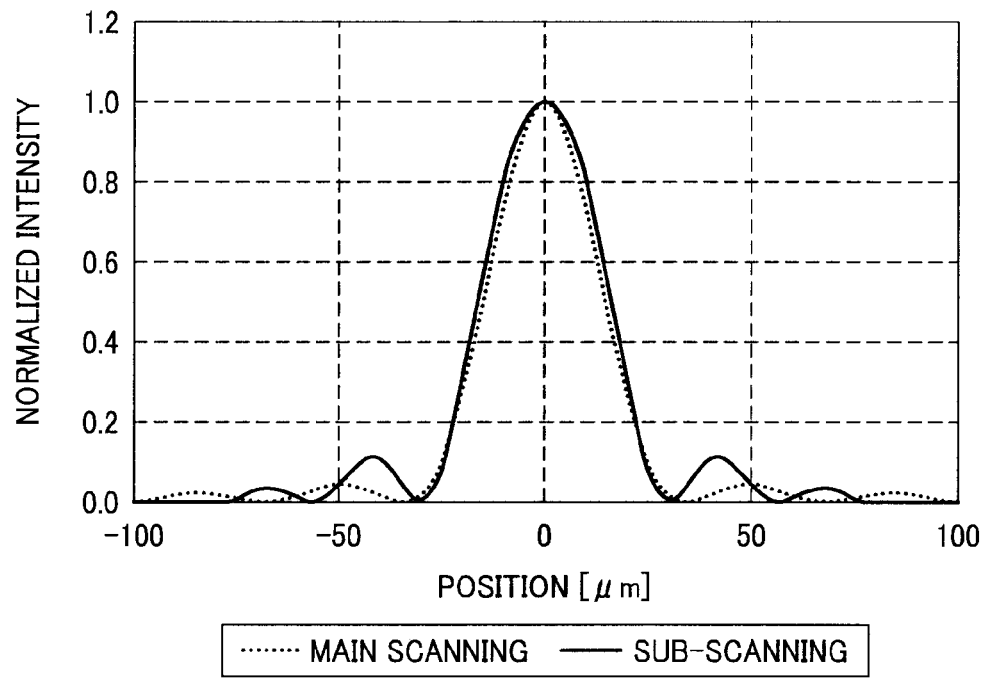
FIGS. 7A and 7B are graphs showing a beam profile and a depth allowance when a phase adjustment is performed by a phase adjusting element to broaden an aperture size of an apertured plate.
Figure 7B:
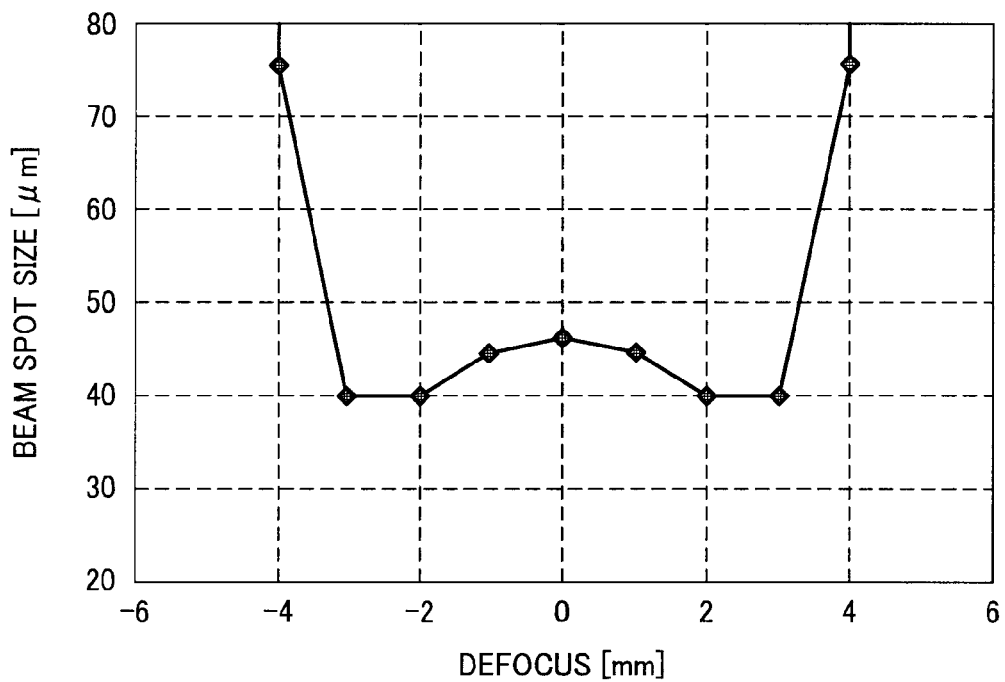

Subsequently, FIGS. 7A and 7B show a simulation result of the simulation 1 where the optical member 120 shown in FIG. 5B is used. FIG. 7A is a graph showing "profiles of a main-scanning cross section and a sub-scanning cross section of a beam profile at a peak intensity" at an imaging-side focal position of the convex lens 130. The peak intensity is normalized to 1. A dashed curve denotes the main-scanning cross section, and a solid curve denotes the sub-scanning cross section.

FIG. 7B is a graph showing a change in a beam spot size with respect to a defocus.

In comparison between the simulation result shown in FIGS. 6A and 6B and the simulation result shown in FIGS. 7A and 7B, a substantially equivalent beam spot size is obtained at the focal position of the convex lens 130 in both cases, and also a depth allowance is comparable in both cases.

However, when the phase adjusting element 120B is used, the aperture of the apertured plate 120A is broadened in the sub-scanning direction from 0.93 mm in the comparative example to 1.57 mm in the simulation 1. Namely, the size of 0.93 mm in the comparative example is "a normalized aperture size in the sub-scanning direction", and an aperture size of the aperture of the apertured plate 120A is "broadened by 0.64 mm in the sub-scanning direction in addition to the normalized aperture size". Specifically, an auxiliary aperture of 0.32 mm in width is formed on each of side ends of the aperture of the normalized aperture size in the sub-scanning direction.

The aperture size of the aperture of the apertured plate 120A is broadened by 0.64 mm in the sub-scanning direction, so that an amount of an optical beam passing through the auxiliary apertures is also focused as the beam spot. As a result, by the use of the optical member 120, an integrated intensity of a main lobe (an actual light intensity of the beam spot) is increased by 14%.

In other words, the light intensity of the beam spot can be increased by broadening the aperture size of the apertured plate 120A to be larger than the normalized aperture size. In addition, a phase of wavefront of the optical beam is adjusted by the phase adjusting element 120B, so that it is possible to obtain "the substantially-same beam spot size and depth allowance as those in the comparative example".

In the simulation 1, the phase distribution of the phase adjusting element is composed of "two phases of a zero-phase and a π-phase". Therefore, it is possible to obtain such "a beam spot size that a positive defocus and a negative defocus are symmetrical" about zero defocus (i.e., about the focal position of the convex lens 130) as shown in FIG. 7B.

In the simulation 1, the apertured plate 120A and the phase adjusting element 120B are integrally combined. The apertured plate 120A and the phase adjusting element 120B can be separately provided. However, in consideration of the situation that "relative positions of the apertured plate and the phase adjusting element need to be adjusted at high accuracy", the apertured plate 120A and the phase adjusting element 120B are preferably combined integrally.

As in the case described above, the phase adjusting element preferably has "a phase distribution having no periodic structure". If the phase distribution has a periodic structure, an optical beam may be diffracted thereby being branched, or a high-level side-lobe peak intensity may be increased thereby preventing "an increase of the integrated intensity of the main lobe". Furthermore, an image formed by the optical scanning may be adversely affected.

In a case where a phase adjustment is performed with the phase adjusting element, on the basis of a phase of a center portion of the phase adjusting element, when "a phase distribution is provided (i.e., a phase adjustment is performed) on near the center portion, the high-level side-lobe peak intensity tends to be increased", so that it becomes difficult to increase "the integrated intensity of the main lobe" of the beam spot. As a result, it fails to increase a light intensity of the beam spot effectively.

In the simulation 1, the phase distribution of the phase adjusting element is "provided near a periphery of the aperture of the apertured plate", so that it is possible to increase the integrated intensity of the main lobe while preventing the increase of the high-level side-lobe peak intensity in the beam profile of the beam spot.

Specifically, when "a distance from the center portion of the phase adjusting element to the periphery of the aperture" is defined as 100%, "the phase distribution on the basis of the phase of the center portion" of the phase adjusting element is preferably provided on at least outside a portion corresponding to 50%, and more preferably provided on outside a portion corresponding to 70%. Incidentally, in the simulation 1, the phase distribution is provided on "outside a portion corresponding to 72% of the distance from the center portion of the phase adjusting element to the periphery of the aperture of the apertured plate", and excellent characteristics can be obtained as described above.

Furthermore, as in the simulation 1, the phase adjusting element is preferably set so that a phase distribution is line-symmetric about a line running through the center portion of the phase adjusting element (corresponding to the center of the aperture of the apertured plate). The phase adjusting element is most preferably set so that a phase distribution is line-symmetric about "two lines running through the center of the phase distribution to be parallel to the main scanning direction and the sub-scanning direction respectively". As a result, it is possible to prevent "an occurrence of a bias in an intensity distribution of the beam profile", so that a depth allowance can be ensured sufficiently.

However, by the use of the phase adjusting element, a light use efficiency decreases due to a Fresnel loss of both faces of the phase adjusting element. To avoid the Fresnel loss thereby improving the light use efficiency effectively, an antireflection function is preferably provided on at least one face of the phase adjusting element, but more preferably on both faces thereof. The antireflection function can be realized in such a manner that an antireflection coating film is applied to the face(s) of the phase adjusting element or the face(s) of the phase adjusting element has a microscopic concavo-convex shape.

In the simulation 1, "a high-level side lobe having a slightly high intensity" is generated in a portion outside of a wave pattern of the main lobe in the main scanning direction in the graph shown in FIG. 7A. The beam profile shown in FIG. 7A has no problem in most cases; however, it is possible to "decrease the high-level side-lobe peak intensity" in a simulation 2 described below.

Figure 8:
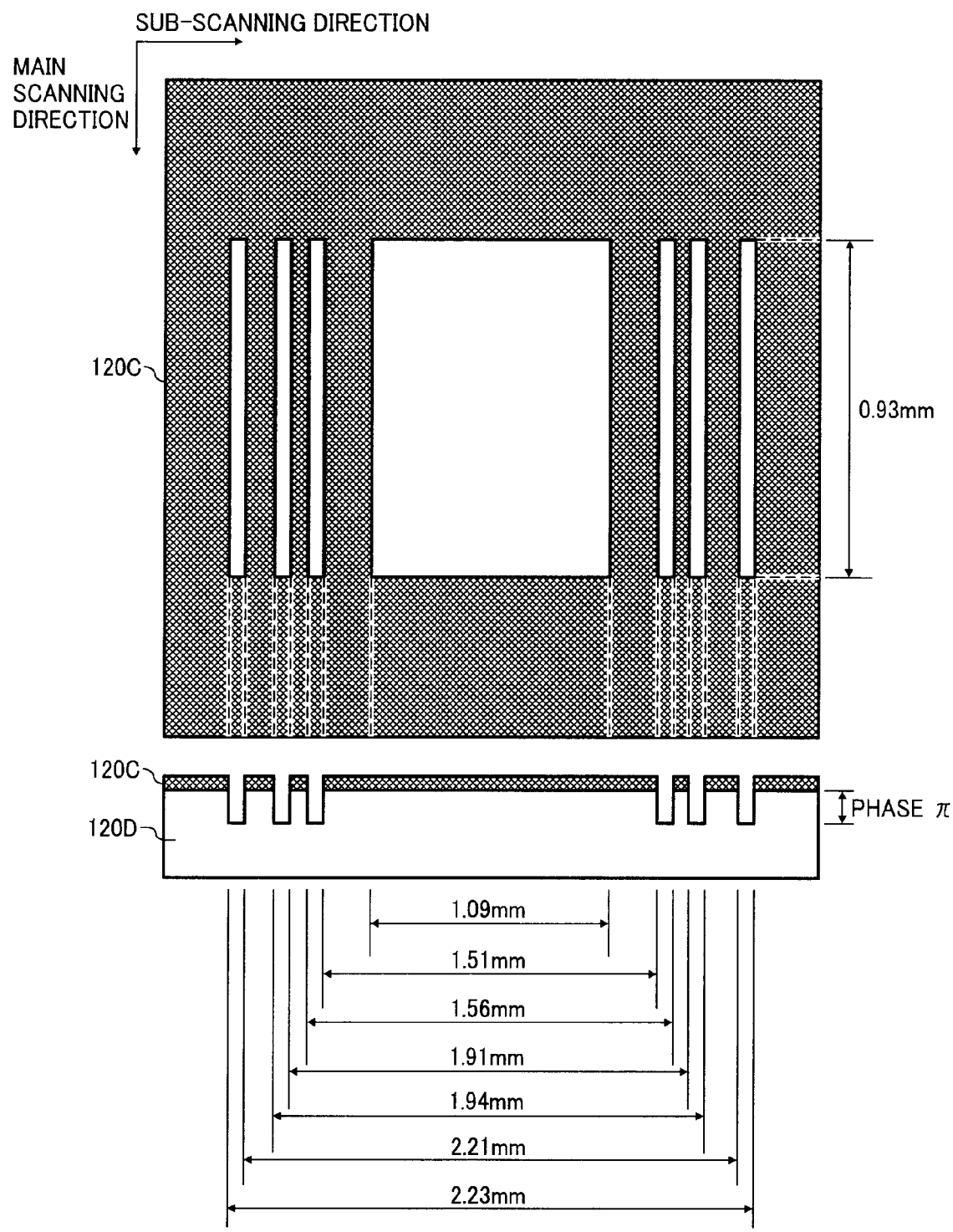
FIG. 8 is a schematic diagram for explaining an apertured plate and a phase adjusting element used in another simulation.

FIG. 8 shows another example of the optical member. The optical member shown in FIG. 8 is an integrated combination of an apertured plate 120C and a phase adjusting element 120D. In this example, "three apertures" are additionally formed on each of both sides of the normally used aperture having the normalized aperture size (located in the center of the apertured plate 120C shown in FIG. 8) of the apertured plate 120C in the sub-scanning direction. "Grooves extending in the main scanning direction" are formed on the phase adjusting element 120D to correspond to the three pairs of the apertures. A depth of the grooves is set so that "a phase difference with respect to a use wavelength is $\pi$". A dimension of each of the grooves and the apertures is as shown in FIG. 8.

Conditions of the simulation 2 are identical to those for the simulation 1 as described above with reference to FIGS. 5A and 5B.

Namely, "a plane wave having a uniform light intensity" is incident from the side of the light source on the apertured plate 120C, and an ideal convex lens having a focal length of 50 mm is arranged at a position located 50 mm away from the phase adjusting element 120D.

Figure 9A:
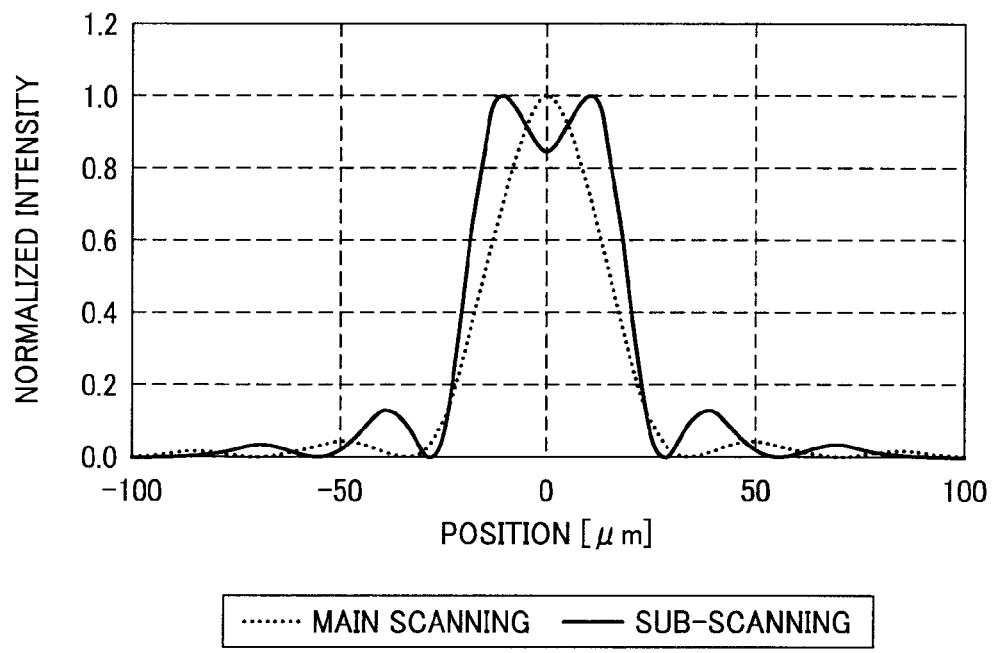
FIGS. 9A and 9B are graphs showing a beam profile and a depth allowance as a result of the simulation with the apertured plate and the phase adjusting element shown in FIG. 8.
Figure 9B:
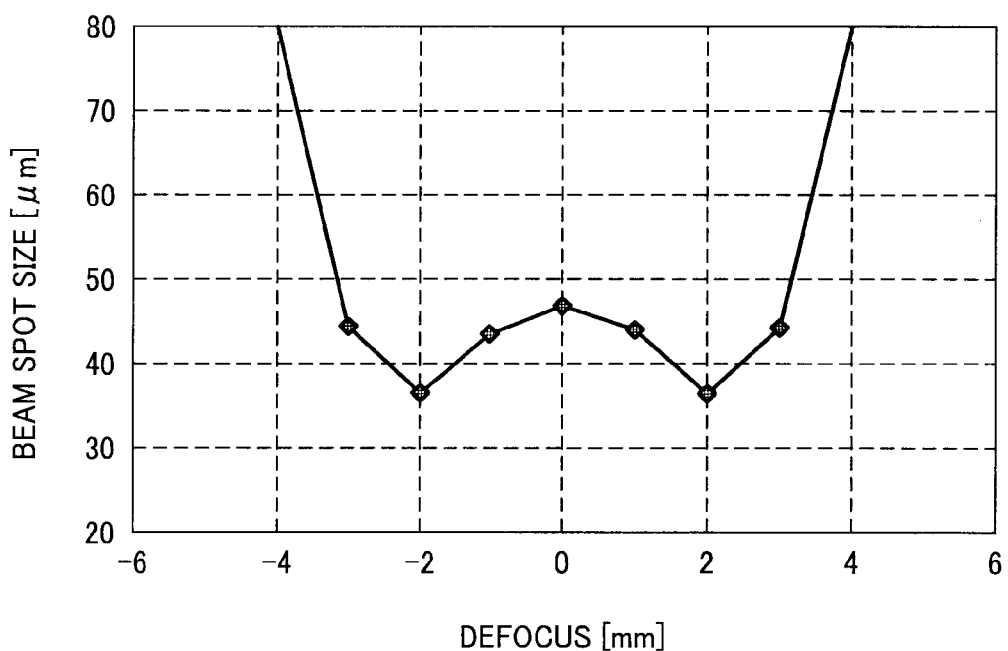

FIGS. 9A and 9B show a simulation result of the simulation 2.

FIG. 9A is a graph showing profiles of a main-scanning cross section and a sub-scanning cross section of "a beam profile at a peak intensity" at a focal position of the convex lens. The peak intensity is normalized to 1. FIG. 9B is a graph showing "a change in a beam spot size with respect to a defocus".

In comparison between the simulation result of "the comparative example" shown in FIGS. 6A and 6B and the simulation result of the simulation 2 shown in FIGS. 9A and 9B, a beam spot size and a depth allowance are substantially equivalent to those in the comparative example. However, in the simulation 2, the three apertures are additionally formed as auxiliary apertures on each of the both sides of the aperture having the normalized aperture size of the apertured plate 120C in the sub-scanning direction, so that a width of the apertures in the sub-scanning direction is broadened from 0.93 mm in the comparative example to 2.23 mm (a width between the outermost apertures in FIG. 8). As a result, the integrated intensity of the main lobe can be increased by 19% as compared with that is in the comparative example.

Furthermore, in the simulation 2 where the optical member shown in FIG. 8 is used, the high-level side-lobe peak intensity in the beam profile (in a portion outside a wave pattern in the graph shown in FIG. 9A) is reduced more than that is in the simulation 1 where the optical member shown in FIGS. 6A and 6B is used.

In this manner, the auxiliary apertures are additionally formed on each of the both sides of the aperture having the normalized aperture size located in the center of the apertured plate independently, and a phase of at least one pair of the additionally-formed auxiliary apertures is set to be different from that of the aperture located in the center of the apertured plate. Therefore, it is possible to improve the light use efficiency with preventing the beam spot size from being narrowed excessively while keeping the depth allowance at the same degree as the case where the apertured plate includes the aperture having the normalized aperture size only. Furthermore, it is possible to reduce a generation of a high-level side lobe.

In the above example, the auxiliary apertures are additionally formed in the sub-scanning direction only. Alternatively, the auxiliary apertures can be additionally formed not only in the sub-scanning direction but also in the main scanning direction. Furthermore, in the above example, the auxiliary apertures are additionally formed on each of the both sides of the aperture having the normalized aperture size located in the center of the appertured plate. Alternatively, the auxiliary apertures can be additionally formed to surround the center aperture. Moreover, the rectangular apertures are used in the above example. However, the apertures are not limited to be rectangular in shape. Alternatively, the apertures can be oval or substantially oval in shape. In addition, a phase of the additionally-formed auxiliary apertures is set to have the phase difference of n with respect to that of the center aperture (i.e., only two phases of the zero-phase and the $\pi$-phase are used), but not limited to the two phases. Alternatively, each of the pairs of the additionally-formed auxiliary apertures can be set to have a different phase from one another, i.e., three or more phases of the apertures can be used.

Furthermore, as described above, the apertured plate and the phase adjusting element can be separately provided. The "grooves composing the phase distribution" of the phase adjusting element 120D shown in FIG. 8 are formed on each of both sides of the center "aperture having the normalized aperture size" by three grooves each across the center aperture. As shown in FIG. 8, a width of each pair of the grooves (i.e., a portion of the grooves where a phase differs) and a distance between the grooves are not periodically patterned.

In the simulation 2, when the auxiliary apertures are additionally formed on the periphery of the center aperture of the apertured plate, "an average phase of at least one aperture" out of the additionally-formed auxiliary apertures is set to be different from that of the center aperture. Therefore, it is possible to improve the light use efficiency while preventing the beam spot size from being narrowed excessively and keeping the depth allowance. Furthermore, it is possible to reduce a generation of a high-level side lobe.

The above simulations 1 and 2 show that even if an aperture size of the aperture is broadened larger than the normalized aperture size, a loss in a spot size or narrowing of a depth allowance can be effectively reduced or prevented by performing a phase adjustment by the phase adjusting element.

In the above simulations 1 and 2, "a simplified model as shown in FIGS. 5A and 5B" is used, and a beam spot is formed by "an axisymmetric convex lens" having a focal length of 50 mm. In an actual optical scanning device, a combined focal length of the optical elements located posterior to the aperture is different from the focal length of the convex lens used in the simulations, and the focal length in the main scanning direction differs from that is in the sub-scanning direction.

When the focal length is changed, "a beam spot size" changes; however, a beam profile stays about the same. To change only the beam spot size without changing the beam profile, "a phase distribution of an aperture size of the apertured plate (including the auxiliary apertures) and the phase adjusting element" is proportionally increased (or proportionally decreased). In this case, the focal length in the main scanning direction differs from that is in the sub-scanning direction, so that a different "rate of the proportional increase (or the proportional decrease)" of the phase distribution of the aperture size of the apertured plate and the phase adjusting element is set between in the main scanning direction and in the sub-scanning direction.

As described above, to apply the simulation result of the simplified model to the actual optical scanning device, the phase distribution of the aperture size of the apertured plate and the phase adjusting element is proportionally increased (or proportionally decreased), and thereby making a rate of the proportional increase (or the proportional decrease) different between in the main scanning direction and in the sub-scanning direction.

In the simulations 1 and 2, it is assumed that an incident light is "a plane wave having a uniform light intensity". However, an optical beam from a laser light source is generally coupled to have "a light intensity distribution of a Gaussian distribution". Although a shape and a size of a beam profile change with changing the light intensity distribution of the incident light, when an optical scanning is performed under usual conditions, it can be assumed that a light passing through the aperture of the apertured plate is substantially uniform in the intensity. In the actual optical scanning device, "a disagreement with the uniform light intensity" in the light intensity distribution of the incident light can be corrected by modifying a shape of the aperture of the apertured plate or a shape of a phase distribution of the phase adjusting element slightly, so that the actual optical scanning device can obtain a similar result to the simulation result of the simplified model.

Subsequently, a numerical example of the optical scanning device explained above with reference to FIG. 1 is concretely described below.

Figure 10:
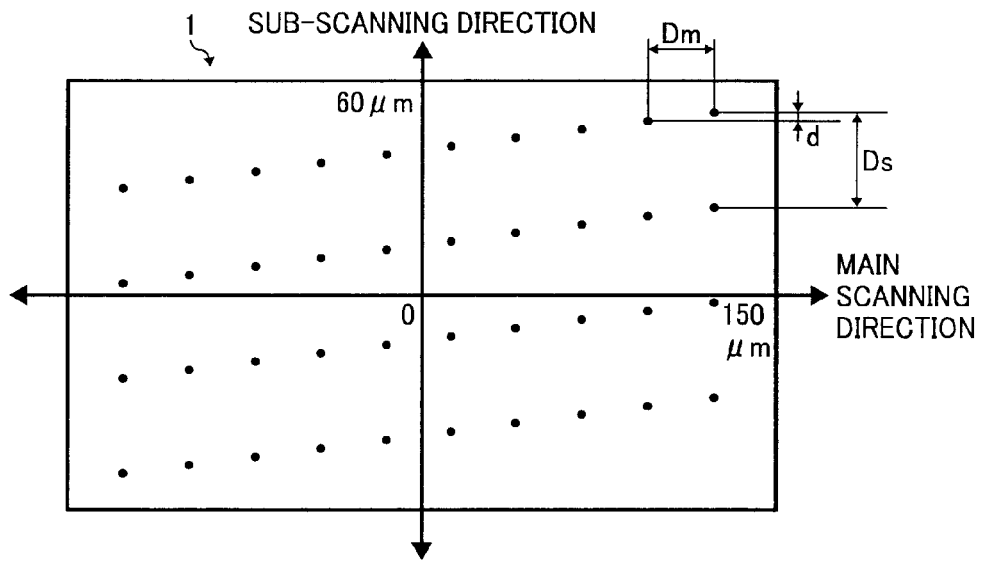
FIG. 10 is a schematic diagram of one example of a vertical cavity surface emitting laser (VCSEL) as a laser light source.

As the laser light source 1, a vertical cavity surface emitting laser (VCSEL) in which a plurality of light emitting elements is two-dimensionally arrayed is used. FIG. 10 shows the array of the light emitting elements (indicated by black dots) in the VCSEL. In this case, ten numbers of the light emitting elements are arrayed by each of four rows, i.e., the VCSEL includes a 4×10 array of the light emitting elements.

It is assumed that the adjacent light emitting elements in the sub-scanning direction are arrayed at equal intervals "Ds", the number of light sources in the main scanning direction is "n", and a distance "d" between the adjacent light emitting elements, which are located on the same row in the main scanning direction, in the sub-scanning direction is equally set to meet a condition of "d=Ds/n". Furthermore, it is assumed that the adjacent light emitting elements in the main scanning direction are arrayed at equal intervals "Dm". Specifically, the equal interval "Ds" is set to 44 μm, and the equal interval "Dm" is set to 30 μm, so that the distance "d" becomes 4.4 μm. Incidentally, it is necessary to determine the equal intervals "Ds" and "Dm" between the adjacent light emitting elements respectively in the sub-scanning direction and the main scanning direction in consideration of an effect of a thermal interference from other light emitting elements during operations. The light emitting elements in the main scanning direction are spaced from one another not to affect a density growth in the sub-scanning direction. Therefore, it is possible to reduce the effect of the thermal interference among the light emitting elements and to ensure a space for wiring of each of the light emitting elements.

In the VCSEL, a fluctuation in a lasing wavelength with changes in temperature is moderate, and a discontinuous change in the wavelength (wavelength hopping) does not occur in principle. Therefore, optical characteristics of the VCSEL are hardly degraded regardless of environmental changes.

The lasing wavelength is 780 nanometers (nm).

The coupling lens 3 and the cylinder lens 5 can be made of any of glass and plastic. When the plastic ones are employed, a diffractive-optical element is to be included therein so as to reduce a degradation of the optical characteristics due to a temperature change.

The laser light source 1 and the coupling lens 3 are fixed on the same member made of an aluminum material.

A focal length F1 of the coupling lens 3 is 47.7 mm. A thickness of the coupling lens 3 on an optical axis is 3 mm. The coupling lens 3 couples a luminous flux from the laser light source 1 to shape into a substantially-parallel beam.

The coupling lens 3 is arranged at a position located 46.06 mm away from the laser light source 1.

The apertured plate in the optical member 12 is arranged on the side of the coupling lens 3, and a distance between the apertured plate and the coupling lens 3 is 41.69 mm. An incident optical beam on the apertured plate shapes a circle of 9.58 mm×9.58 mm (defined by $1/e^2$).

The "phase adjusting element" is integrally combined with the apertured plate, and arranged between the coupling lens 3 and the cylinder lens 5.

A focal length F2 of the cylinder lens 5 is 107.0 mm. The cylinder lens 5 is arranged at a position located 12.85 mm away from the phase adjusting element in the optical member 12. A thickness of the cylinder lens 5 is 3.0 mm. A distance from the cylinder lens 5 to an incident point on a deflection surface of the polygon mirror 7 is 108.7 mm.

A radius of an inscribed circle of the polygon mirror 7 is 7 mm. The number of the deflection surfaces of the polygon mirror 7 is four.

The f-theta lens is composed of the scanning lenses 8 and 10. A thickness of the scanning lens 8 on an optical axis is 13.5 mm. A thickness of the scanning lens 10 on an optical axis is 3.5 mm.

An incidence-side plane (L1R1) of the scanning lens 8 is "a plane having a noncircular shape in the main scanning direction and a circular shape in the sub-scanning direction". A projection-side plane (L1R2) of the scanning lens 8 is "a plane having a noncircular shape in the main scanning direction, and a curvature C(Y) of the plane in the sub-scanning direction is getting changed toward the main scanning direction".

An incidence-side plane (L2R1) of the scanning lens 10 is "a plane having a noncircular shape in the main scanning direction, and a curvature C(Y) of the plane in the sub-scanning direction is getting changed toward the main scanning direction". A projection-side plane (L2R2) of the scanning lens 10 is "a plane having a noncircular shape in the main scanning direction and a circular shape in the sub-scanning direction".

The noncircular shape is expressed as $$X=(Y^2/Rm)/[1+\sqrt{\{1-(1+a00)(Y/Rm)^2\}}]+a01 \cdot Y + a02 \cdot Y^2 + a03 \cdot Y^3 + a04 \cdot Y^4 + \Delta \quad (1)$$

The change in the curvature C(Y) is expressed as $$Cs(Y)=\{1/Rs(0)\}+b01 \cdot Y + b02 \cdot Y^2 + b03 \cdot Y^3 + \Delta \quad (2)$$

In Equations (1) and (2), "X" denotes a coordinate of each of the scanning lenses 8 and 10 in a direction of the optical axis, "Y" denotes a coordinate of each of the scanning lenses 8 and 10 in the main scanning direction, "Rm" denotes a radius of paraxial curvature in the main scanning direction, "a00, a01, a02, . . . " respectively denote an aspheric coefficient in the main scanning direction, "Rs(0)" denotes a radius of paraxial curvature in the sub-scanning direction, and "b00, b01, b02, . . . " respectively denote an aspheric coefficient in the sub-scanning direction.

The scanning lens 8 is arranged so that the incidence-side plane L1R1 is located 46.31 mm away from a starting point for the deflection by the polygon mirror 7, and is 13.5 mm in thickness. The scanning lens 10 is arranged so that the incidence-side plane L2R1 is located 89.73 mm away from the projection-side plane L1R2 of the scanning lens 8, and is 3.50 mm in thickness. A distance from the projection-side plane L2R2 of the scanning lens 10 to the scanning surface 11 is 141.36 mm.

An angle made at the meeting of a direction of an optical beam incident on the deflection surface from the side of the laser light source 1 and the optical axis of each of the scanning lenses 8 and 10 is 60 degrees.

Table 1 shows data on the planes L1R1 and L1R2 of the scanning lens 8 and L2R1 and L2R2 of the scanning lens 10.

TABLE 1

|  | L1R1 | L1R2 | L2R1 | L2R2 |
|---|---|---|---|---|
| Rm | −120 | −59.279 | −10000 | 540.625 |
| Rs0 | −500 | −600 | 521.92 | −40.751 |
| a00 | 0.00000E+00 | 0.00000E+00 | 0.00000E+00 | 0.00000E+00 |

TABLE 1-continued

|  | L1R1 | L1R2 | L2R1 | L2R2 |
|---|---|---|---|---|
| a04 | 8.88524E−07 | 9.22409E−07 | 3.28563E−07 | 1.27798E−07 |
| a06 | −2.62914E−10 | 6.77825E−11 | −7.08542E−11 | −4.62873E−11 |
| a08 | 2.18464E−14 | −4.11244E−14 | 6.26922E−15 | 4.04921E−15 |
| a10 | 1.36766E−17 | 1.3728E−17 | −2.73157E−19 | −1.65975E−19 |
| a12 | −3.13542E−21 | 2.06956E−21 | 4.73881E−24 | 2.58548E−24 |
| b01 | — | −1.59477E−06 | 7.57567E−07 | — |
| b02 | — | −4.33213E−06 | −1.1328E−06 | 2.31146E−07 |
| b03 | — | 4.98199E−09 | 2.60617E−10 | — |
| b04 | — | 2.85938E−09 | 7.89614E−11 | — |
| b05 | — | −2.67713E−12 | −5.02709E−14 | — |
| b06 | — | 2.87783E−13 | 1.40512E−14 | — |
| b07 | — | −1.91653E−15 | 4.55389E−18 | — |
| b08 | — | 2.04238E−15 | −2.01401E−18 | — |
| b09 | — | 1.01413E−18 | −1.54602E−22 | — |
| b10 | — | −6.72997E−19 | 7.48935E−23 | — |

A lateral magnification of the entire imaging optical system (the optical elements located between the laser light source 1 and the scanning surface 11) is 2.18× in the sub-scanning direction, and a lateral magnification of the scanning lenses 8 and 10 (the f-theta lens) only is −0.97×. A focal length of the f-theta lens is 237.8 mm in the main scanning direction and 71.4 mm in the sub-scanning direction.

A write width of an optical scanning is ±161.5 mm.

An aim of a beam spot size is 52 μm in the main scanning direction and 55 μm in the sub-scanning direction.

As "a comparative example" of the optical scanning device, when the phase adjusting element is "a parallel plate with no phase adjusting function", and the apertured plate including one aperture having the normalized aperture size is used, such an apertured plate including the rectangular aperture having the normalized aperture size of 5.44 mm in the main scanning direction and 2.10 mm in the sub-scanning direction is to be used. In a general optical scanning device, the apertured plate including such an aperture extending in the main scanning direction is used.

A surface-emitting laser generally emits an optical beam having an axisymmetric "circular far-field pattern" (in the present embodiment, a circular of 9.58 mm×9.58 mm on the apertured plate). Therefore, in this case, when the apertured plate described above is used, a light use efficiency in the sub-scanning direction is decreased.

To reduce the decrease in the light use efficiency, the apertured plate is configured so that a width of the aperture in the sub-scanning direction (in the case shown in FIG. 8, a distance between the outermost apertures, i.e., 2.23 mm) is longer than that is in the main scanning direction. At this time, "a phase distribution of the phase adjusting element" is set so that a beam spot size on the scanning surface and a depth allowance can be kept constant.

When paraxial focal lengths in the main scanning direction and the sub-scanning direction of "the combined optical elements located posterior to the apertured plate" are denoted by "fm" and "fs" respectively, in the above optical scanning device, the paraxial focal length "fm" in the main scanning direction is 237.59 mm and the paraxial focal length "fs" in the sub-scanning direction is 104.84 mm. In a case where the phase adjusting element has no phase adjusting function, when lengths of the aperture having the normalized aperture size in the main scanning direction and the sub-scanning direction are denoted by "dm" and "ds" respectively, the length "dm" in the main scanning direction is 5.44 mm and the length "ds" in the sub-scanning direction is 2.10 mm as described above.

A value of "dm/fm" is about 0.023, and a value of "cLs/fs" is about 0.020. In this manner, the value of "cds/fs" in the sub-scanning direction is slightly smaller than the value of "dm/fm" in the main scanning direction in general.

When the phase adjusting element of the light source module according to the present invention is used, a width of the aperture of the apertured plate (in the case shown in FIG. 8, a distance between the outermost apertures, i.e., 2.23 mm) can be broadened. Therefore, a beam spot size on the scanning surface and a depth allowance can be substantially identical to those in the comparative example, and a value of "dm/fm" or a value of "ds/fs" can be increased.

In view of a shape of the aperture of the apertured plate and a shape of a cross section of a luminous flux of optical beams incident on the aperture, a width of the aperture of the apertured plate in the sub-scanning direction is to be broadened because the light use efficiency can be effectively improved. This is the reason Why an increasing amount of a value of "ds/fs" is set to be larger than that of a value of "dm/fm". Namely, the phase adjusting element and the apertured plate are preferably provided so as to meet a condition of "dm/fm<ds/fs".

If the width of the aperture of the apertured plate is too large with respect to a beam size of an incident optical beam, a beam spot size on the scanning surface fluctuates due to "a fluctuation in an angle of divergence" of the laser light source. Therefore, the width of the aperture is not to be broadened excessively.

When a light having a uniform intensity (a light having an infinite incident-beam size) is incident on the aperture of the apertured plate, it is assumed that a beam spot size of a beam spot formed on a focal position of a lens is normalized to 1. In this case, it is assumed that the apertured plate includes one aperture. However, if the apertured plate includes a plurality of apertures as shown in FIG. 8, the apertures are regarded as a single aperture having an aperture width corresponding to a distance between the outermost apertures.

Figure 11:
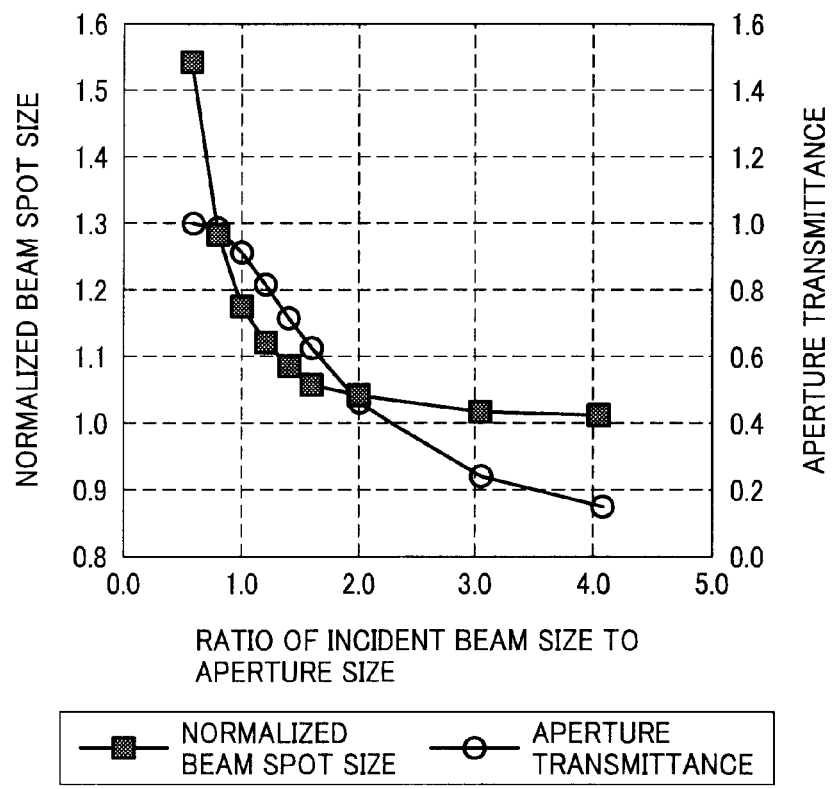
FIG. 11 is a graph for explaining an invention according to claim 9.

FIG. 11 shows a simulation result of a change in a beam spot size on the focal position of the lens (hereinafter, "a normalized beam-spot size") with a change in a ratio of an incident optical-beam size to the aperture size (hereinafter, "a ratio A") (see a broken line with solid squares).

In addition, FIG. 11 shows a simulation result of a change in a ratio of an amount of an optical beam after passing through the apertured plate to an amount of an optical beam before passing through the apertured plate (hereinafter, "an aperture transmittance") with a change in the ratio A of the incident optical-beam size to the aperture size (see a broken line with circles).

As shown in FIG. 11, when the ratio A is smaller than 1, the normalized beam-spot size changes precipitously. This means that "when an optical beam size incident on the apertured plate fluctuates due to a fluctuation in an angle of divergence of the laser light source, a beam spot size on a focal position on which an optical beam is focused by the lens fluctuates drastically". Such a fluctuation in the beam spot size on the focal position of the lens causes degradation in a quality of an output image when the optical scanning device is applied to an image forming apparatus.

Therefore, a width of the aperture of the apertured plate and an incident beam size are preferably set so that the ratio A becomes 1 or more.

As described above, in a usual optical scanning device, a light use efficiency of the apertured plate is worse in the sub-scanning direction than that of in the main scanning direction. Therefore, the phase adjusting element is preferably set to have a phase distribution in the sub-scanning direction only. At this time, the aperture is preferably rectangular in shape because a depth allowance and a beam spot size in the sub-scanning direction can be controlled independently from those in the main scanning direction.

In this manner, by the use of the optical scanning device including the light source module according to the present invention, it is possible to increase an amount of light transmitted to an image carrier with keeping a beam spot size on the image carrier and a depth allowance to "a substantially desired size". Therefore, the optical scanning device can realize a high-speed optical scanning, and provide a high-quality output image at high speed.

The optical scanning device described above with concrete numerical values has the optical configuration shown in FIG. 1. Needless to say, the optical scanning device can be applied to a color image forming apparatus as shown in FIGS. 2 and 3 or a monochrome image forming apparatus.

As explained above, according to an aspect of the present invention, it is possible to provide a light source module, an optical scanning device, and an image forming apparatus with novelty. The light source module according to the invention has the configuration as described above, so that it is possible to achieve a high-speed optical scanning by increasing an amount of an optical beam passing through the apertured plate thereby improving an optical transfer efficiency, and also it is possible to reduce or prevent a decrease in a beam spot size and narrowing of a depth allowance effectively. Therefore, by the use of the light source module according to the invention, it is possible to achieve a high-speed optical scanning and a high-speed image formation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source module for an optical scanning device including a deflecting unit that deflects an optical beam and an imaging optical system that focuses the optical beam on a scanning surface as a beam spot to optically scan the scanning surface, the light source module comprising:
   a laser light source that emits an optical beam;
   a coupling lens that collimates the optical beam emitted from the laser light source, and outputs a collimated optical beam having a desired beam spot size;
   an aperture that shields a peripheral light flux area of the collimated optical beam output from the coupling lens;
   a phase adjusting element that partially changes a phase of wavefront of the optical beam; and
   an auxiliary aperture formed on an outer side of a normalized aperture size, which is a size of the aperture when the beam spot formed on the scanning surface meets design values of a beam spot size and a depth allowance, in at least one of a main scanning direction and a sub-scanning direction, wherein
   the phase adjusting element is formed in a parallel plate, and changes at least a phase of wavefront of a peripheral portion of the optical beam to compensate decreases of the beam spot size and the depth allowance caused by the auxiliary aperture.

2. The light source module according to claim 1, wherein the laser light source is a vertical cavity surface emitting laser including at least one light emitting source.

3. The light source module according to claim 1, wherein the phase adjusting element is symmetric about a center of the aperture.

4. The light source module according to claim 1, wherein the auxiliary aperture is formed by extending the aperture to the outer side of the normalized aperture size in at least on of the main scanning direction and the sub-scanning direction.

5. The light source module according to claim 1, wherein the auxiliary aperture includes at least one pair of auxiliary apertures formed separately on the outer side of the normalized aperture size in at least one of the main scanning direction and the sub-scanning direction, and the phase adjusting element changes the phase at portions corresponding to the auxiliary apertures.

6. The light source module according to claim 5, wherein the phase adjusting element changes the phase such that an average phase in the auxiliary apertures differs from an average phase of the aperture.

7. The light source module according to claim 1, wherein the phase adjusting element includes an antireflection unit on at least one of an incident surface and an output surface.

8. An image forming apparatus that forms a color image by forming at least two electrostatic latent images on at least one image carrier using an optical scanning, developing the electrostatic latent images into toner images in different colors, and transferring the toner images onto a transfer medium in a superimposed manner, the image forming apparatus comprising the light source module according to claim 1 as many as number of the image carriers.

9. An optical scanning device comprising:

a deflecting unit that deflects an optical beam emitted from at least one laser light source;

at least one imaging optical system that focuses the optical beam deflected by the deflecting unit on at least one scanning surface as a beam spot; and at least one light source module including a laser light source that emits an optical beam, a coupling lens that collimates the optical beam emitted from the laser light source, and outputs a collimated optical beam having a desired beam spot size, an aperture that shields a peripheral light flux area of the collimated optical beam output from the coupling lens, a phase adjusting element that partially changes a phase of wavefront of the optical beam, and an auxiliary aperture formed on an outer side of a normalized aperture size, which is a size of the aperture when the beam spot formed on the scanning surface meets design values of a beam spot size and a depth allowance, in at least one of a main scanning direction and a sub-scanning direction, wherein the phase adjusting element is formed in a parallel plate, and changes at least a phase of wavefront of a peripheral portion of the optical beam to compensate decreases of the beam spot size and the depth allowance caused by the auxiliary aperture.

10. The optical scanning device according to claim 9, wherein the laser light source is a vertical cavity surface emitting laser including at least one light emitting sources, and a following relationship is satisfied $dm/fm < ds/fs$, where dm and ds are widths of the aperture including the auxiliary aperture in the main scanning direction and in the sub-scanning direction, respectively, and fm and fs are focal lengths of an optical system at a subsequent stage of the aperture in the main scanning direction and in the sub-scanning direction, respectively.

11. The optical scanning device according to claim 9, wherein the phase adjusting element changes the phase in the sub-scanning direction only.

12. An image forming apparatus that forms an image by forming an electrostatic latent image on an image carrier using an optical scanning and developing the electrostatic latent image into a toner image, the image forming apparatus comprising the optical scanning device according to claim 9 to perform the optical scanning.

* * * * *